(12) United States Patent
Zhou et al.

(10) Patent No.: US 11,133,849 B2
(45) Date of Patent: Sep. 28, 2021

(54) SPLIT RADIO CHANIS INTO SUBSETS

(71) Applicant: Hewlett Packard Enterprise Development LP, Houston, TX (US)

(72) Inventors: Qiang Zhou, Sunnyvale, CA (US); Guang-Zhi Ran, Beijing (CN); Jian-Po Han, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/981,598

(22) PCT Filed: Mar. 16, 2018

(86) PCT No.: PCT/CN2018/079322
§ 371 (c)(1),
(2) Date: Sep. 16, 2020

(87) PCT Pub. No.: WO2019/174042
PCT Pub. Date: Sep. 19, 2019

(65) Prior Publication Data
US 2021/0021312 A1    Jan. 21, 2021

(51) Int. Cl.
*H04B 7/06* (2006.01)
*H04W 4/50* (2018.01)
*H04B 7/0452* (2017.01)

(52) U.S. Cl.
CPC ......... *H04B 7/0617* (2013.01); *H04B 7/0452* (2013.01); *H04W 4/50* (2018.02)

(58) Field of Classification Search
CPC .. H04B 7/0691; H04B 7/0602; H04W 72/042
See application file for complete search history.

(56) References Cited

U.S. PATENT DOCUMENTS

| | | | |
|---|---|---|---|
| 8,774,728 B2 | 7/2014 | Berens et al. | |
| 9,167,474 B2 | 10/2015 | Picker | |
| 9,271,322 B2 | 2/2016 | Vaidya et al. | |
| 9,439,099 B2 | 9/2016 | Emmanuel et al. | |
| 10,212,660 B2 * | 2/2019 | Nilsson ............. | H04W 52/0216 |
| 2005/0148311 A1 | 7/2005 | Anderson | |

(Continued)

FOREIGN PATENT DOCUMENTS

| CN | 103648137 A | 3/2014 |
|---|---|---|
| CN | 103702309 A | 4/2014 |

OTHER PUBLICATIONS

International Search Report and Written Opinion received for PCT Patent Application No. PCT/CN2018/079322, dated Dec. 19, 2018, 9 pages.

(Continued)

*Primary Examiner* — Kevin Kim
(74) *Attorney, Agent, or Firm* — Hewlett Packard Enterprise Patent Department

(57) ABSTRACT

An example device may include a processor to cause a plurality of radio chains of a network device to provide a first service; receive a request for a second service to be provided by the network device; split the plurality of radio chains into at least a first subset and a second subset, wherein the first subset provides the first service, wherein the second subset provides the second service, and wherein the first subset and the second subset are non-overlapping.

15 Claims, 14 Drawing Sheets

(56) References Cited

U.S. PATENT DOCUMENTS

2014/0355532 A1   12/2014  Shapira
2016/0338036 A1   11/2016  Pasupuleti et al.
2018/0006696 A1*  1/2018  Yue ................... H04B 7/063
2019/0239225 A1*  8/2019  Siraj ............... H04W 72/0453

OTHER PUBLICATIONS

Jason Hintersteiner, "Wireless Infrastructure: How Does MU-MIMO Work?", Informa PLC, Jun. 27, 2016, 6 pages.

\* cited by examiner

SPLIT RADIO CHAINS INTO SUBSETS

BACKGROUND

A wireless device, e.g. a network device or a client device, may have a multiple-input multiple-output (MIMO) antenna system. A radio of the wireless device may provide a plurality of transmit and receive radio chains communicatively coupled to the MIMO antenna system, such that the wireless device may transmit and receive wireless signals, based on the plurality of transmit and receive radio chains, by utilizing the MIMO antenna system, and the data rate can be increased.

DETAILED DESCRIPTION

Figure 1:
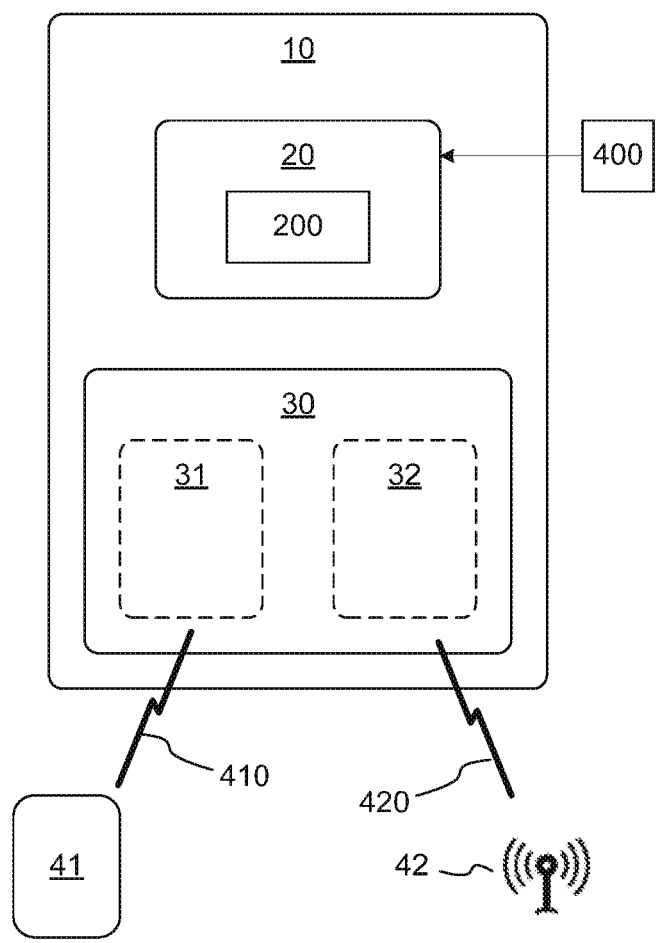
FIG. 1 is a block diagram illustrating an example wireless system according to present disclosure.

A network device, e.g. access point (AP), may provide a primary service (such as wireless network access service for a client device) by operating a plurality of spatial streams on a specified wireless channel, based on its radio chains (e.g. transmit radio chains and receive radio chains of the network device).

The network device may be requested to provide another service (such as a testing service). If the network device can provide the other requested service, the primary service provided by the network device may be impacted.

In one example, the operating channels of the services may be different from each other. For example, the operating channel of the radio chains of the network device may be switched from the operating channel associated with the primary service to the operating channel associated with the requested service, and the primary service may be interrupted due to the switching of the operating channel of the radio chains.

In another example, the operating channel of the requested one of the services may be the same with that of the primary one of the services, the services can be provided on the current operating channel of the radio chains, by time division multiplexing the current wireless channel, and the data rate of the primary one of the services may be reduced.

In order to reduce the interruption of the primary service provided by the network device due to the other requested service, the radio chains may be split into subsets for different services. The subsets split from the radio chains of the network device may operate on different channels, respectively, or may operate on a same channel.

In other words, when the network device provides a first service (such as wireless network access service for a client device) based on its radio chains, if a second service (such as a testing service) is requested to be provided, the radio chains may be split to include a first subset for providing the first service and a second subset for providing the second service. Here, the first subset and the second subset are non-overlapping sets of the radio chains. In some examples, the first subset of the radio chains may operate on the operating channel associated with the first service, and the second subset of the radio chains may operate on the operating channel associated with the second service.

Based on the first subset and the second subset split from the radio chains of the network device, the first service may be maintained and may be not interrupted, and the second service may be also provided during the same time period.

In some cases, the first service provided to a client device for a long duration, e.g. the wireless network access service, may be a primary service of the network device, and the operating channel associated with the first service may be a home channel of the network device. Relative to the first service provided to the client device for the long duration, the second service on the home channel or another channel may be a temporary service, e.g. a testing service, and the first subset and the second subset of radio chains may be combined to provide the first service after the second service is completed (e.g., when a temporary period associated with the second service expires).

In one example, a device comprising a processor to cause a plurality of radio chains of a network device to provide a first service; receive a request for a second service to be provided by the network device; split the plurality of radio chains into at least a first subset and a second subset, wherein the first subset provides the first service, wherein the second subset provides the second service, and wherein the first subset and the second subset are non-overlapping.

In another example, a method comprises causing, by a processor of a device, a plurality of radio chains of a network device to provide a first service; receiving, by the processor, a request for a second service to be provided by the network device; splitting, by the processor, the radio chains into at least a first subset and a second subset, wherein the first subset provides the first service, wherein the second subset provides the second service, and wherein the first subset and the second subset are non-overlapping.

In another example, a non-transitory computer readable storage medium stores instructions that, when executed by a processor of a device, causes the processor to cause a plurality of radio chains of a network device to provide a first service; receive a request for a second service to be provided by the network device; split the plurality of radio chains into at least a first subset and a second subset, wherein the first subset provides the first service, wherein the second subset provides the second service, and wherein the first subset and the second subset are non-overlapping.

As used herein, a "network device" generally includes a device that is adapted to transmit and/or receive signaling and to process information within such signaling and to provide wireless local area network services to a station (e.g., any data processing equipment such as a computer, cellular phone, personal digital assistant, tablet devices, etc.). The "network device" may include access points, data transfer devices, network switches, routers, controllers, etc. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium for. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example wireless system according to present disclosure. Referring to FIG. 1, the wireless system, e.g. a wireless local area networks (WLAN), may include a network device 10 such as an AP, a device 20, a client device 41 and a neighbor network device 41 such as another AP.

The network device 10 may include the device 20 and a plurality of radio chains 30.

In other words, the device 20 may be included in the network device 10 together with the radio chains 30.

The device 20 may include a processor 200. The processor 200 of the device 20 may cause the plurality of radio chains 30 of the network device 10 to provide a first service 410.

For example, the first service may be the wireless network accessing service that is capable of accessing a plurality of the client device including the client device 41 shown in FIG. 1 to the wireless system.

The client device, e.g. the client device 41 shown in FIG. 1, may be a ssmartphone, a mobile phone, a Personal Digital Assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device capable of transmitting and receiving wireless transmissions.

The processor 200 of the device 20 may receive a request 400 for a second service 420 to be provided by the network device 10.

In one example, the request 400 may be a wired or wireless signal generated by and transmitted from a server (not shown in FIG. 1).

In another example, the second service 420 may be the testing service that enables the second subset 32 to operate as the synthetic client, and to cause the network device 10 to emulate a client associating with a neighbor network device 42, so as to conduct the tests via the neighbor network device 42.

For example, an application named "Clarity" may be employed in the wireless system. The application "Clarity" may monitor the deployments and proactively find network/connectivity issues in the deployment, and may throw meaningful/actionable alerts with supporting data so that administrator can take corrective actions to rectify the reported issues. The application "Clarity" may provide clarity live e.g. association, authentication, dynamic host configuration protocol (DHCP) and domain name system (DNS). The application "Clarity" may also provide a clarity synthetic, e.g. connectivity and performance test using a synthetic client, and a client test engine that may bind to one instance of the synthetic client to conduct a sequence of tests such as DNS, uniform resource locator (URL), file transfer protocol (FTP), trivial file transfer protocol (TFTP), transmission control protocol (TCP) tests, and report result), and report the result (such as pass/Mail, bandwidth, delay, throughput, and other stats collected during test, etc.

The processor 200 of the device 20 may also split the plurality of radio chains 30 into at least a first subset 31 and a second subset 32, wherein the first subset 31 provides the first service 410, wherein the second subset 32 provides the second service 420, and wherein the first subset 31 and the second subset 32 are non-overlapping.

The operating channel of the second service 420 may be different with that of the first service 410, or may be the same as that of the first service 410.

The processor 200 of the device 20 may further check the operating channel associated with the second service 420.

In some cases, the processor 200 of the device 20 may split the radio chains 30 in response to determining that the operating channel of the second service 420 is different from that of the first service 410, and may further switch the operating channel of the second subset 32 to be the same as the operating channel of the second service 420, in response to determining that the operating channels of the second service 420 is different from that of the first service 410, such that the first service 410 may be prevent from being broken due to the second service 420.

In other cases, the processor 200 of the device 20 may split the radio chains 30 in response to the request 400 without considering the result of checking the operating channel associated with the second service 420, and may further switch the operating channel of the second subset 32 to be the same as the operating channel of the second service 420, in response to determining that the operating channel of the second service 420 is different from that of the first service 410, such that the first service 410 may be prevent from being broken due to the second service 420 and may be prevent from operating together with the second service 420 by time division multiplexing a same channel.

The processor 200 of the device 20 may further combine the first subset 31 and the second subset 32 in response to a time period associated with the second service 420 expires. The combined radio chains 30 may operate on the operating channel associated with the second service 420 or the first service 410 provided by the network device 10 after combining.

The number of antennas utilized for the first service 410 may be reduced when the radio chains 30 are split into the first subset 31 and the second subset 32, since the number of antennas connected with the first subset 31 may be less than the number of antennas connected with all of the radio chains. Due to the reduction of the number of utilized antennas, an unforeseen change of gain of beamforming (BF) may be generated for the first service 410.

The processor 200 of the device 20 may further refrain from beamforming to a plurality of client devices (including the client device 41 shown in FIG. 1) serviced by the first service 410 provided by the first subset 31 of radio chains 30 for a period of time during which the second subset 32 of radio chains 30 provides the second service 420, and may beamform to the plurality of client devices serviced by the first service 410 provided by the first subset 31 of radio chains 30 in response to the first subset 31 and the second subset 32 of radio chains 30 are combined. For example, the refrained beamforming associated with the first subset 31 may comprise transmit beamforming (TxBF).

Figure 2:
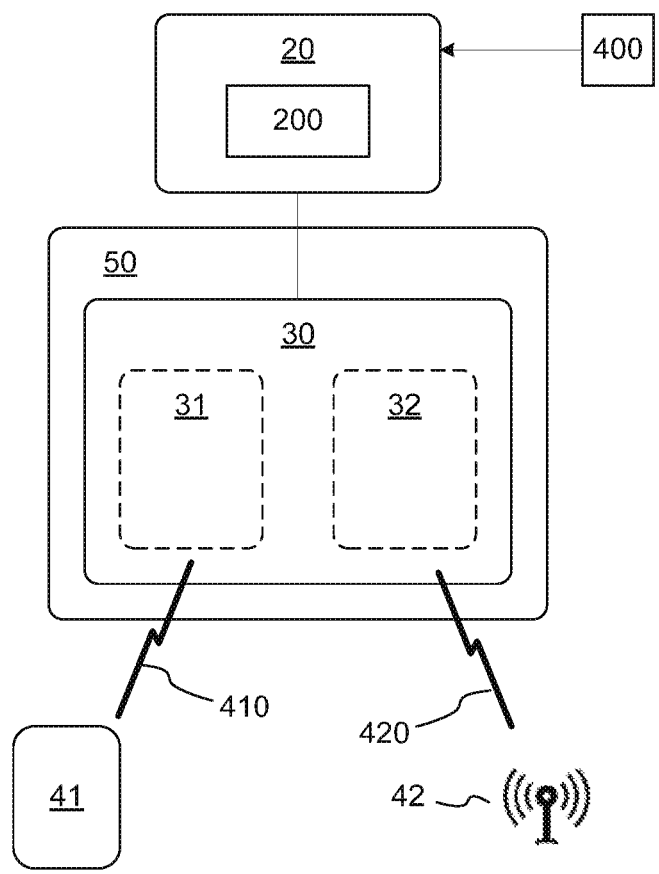
FIG. 2 is a block diagram illustrating another example wireless system according to present disclosure.

FIG. 2 is a diagram illustrating another example wireless system according to present disclosure. Referring to FIG. 2, the wireless system, e.g. a WLAN, may include a network device 50 including the plurality of the radio chains 30, and the wireless system may also include the device 20, the client device 41 and the neighbor network device 42, as shown in FIG. 1.

The network device 50 may exclude the device 20, and the device 20 may be independent from the network device 50 including the radio chains 30. In other words, the radio chains 30 of the network device 50 and the device 20 may be distributed in different entities.

The processor 200 of the device 20 may cause the plurality of radio chains 30 of the network device 50 to provide the first service 410, receive a request 400 for the second service to be provided by the network device 50, and split the plurality of radio chains 30 into at least a first subset 31 and a second subset 32, wherein the first subset 31 provides the first service 410, wherein the second subset 32 provides the second service 420, and wherein the first subset 31 and the second subset 32 are non-overlapping.

The processor 200 of the device 20 may also combine the first subset 31 and the second subset 32 in response to a time period associated with the second service 420 expires, refrain from beamforming to a plurality of client devices (including the client device 41 shown in FIG. 2) serviced by the first service 410 provided by the first subset 31 of radio chains 30 for a period of time during which the second subset 32 of radio chains 30 provides the second service 420, and may beamform to the plurality of client devices serviced by the first service 410 provided by the first subset 31 of radio chains 30 in response to the first subset 31 and the second subset 32 of radio chains 30 are combined.

Figure 3:
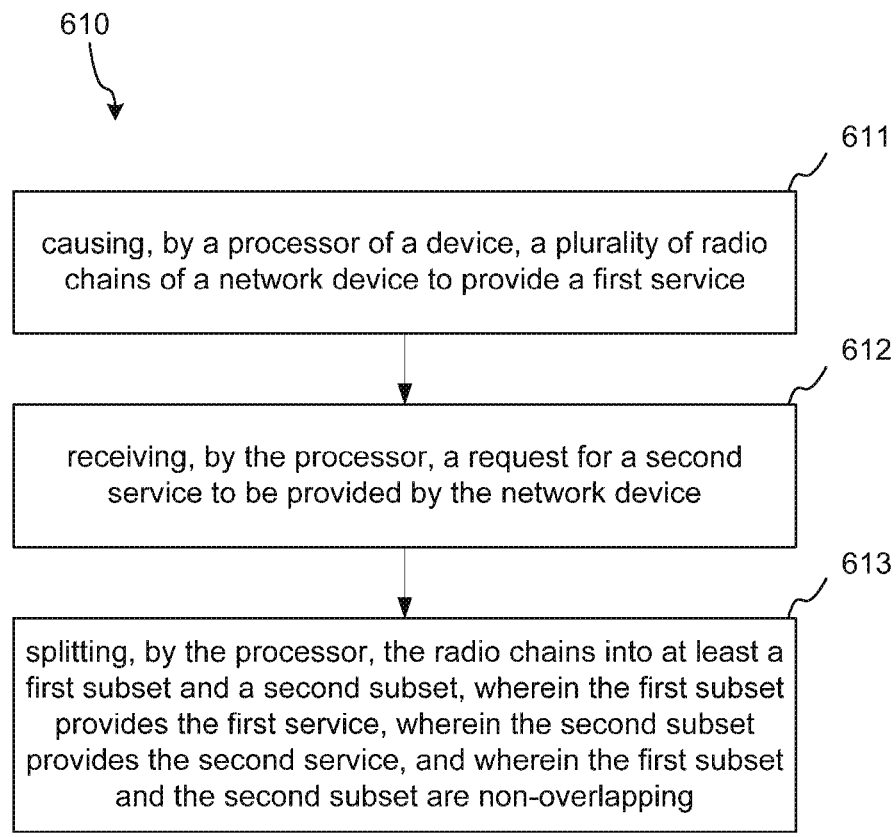
FIG. 3 is a flow chart illustrating an example method of splitting the radio chains into subsets according to present disclosure.

FIG. 3 is a flow chart illustrating an example method of splitting the radio chains into subsets according to present disclosure. Referring to FIG. 3:

The method 610 may comprise: causing, by a processor of a device, a plurality of radio chains of a network device to provide a first service, at block 611.

The method 610 may comprise: receiving, by the processor, a request for a second service to be provided by the network device, at block 612.

In some cases, the device including the processor may be the network device, and the request may be received from a remote device such as a server.

The method 610 may also comprise: splitting, by the processor, the radio chains into at least a first subset and a second subset, at block 613, wherein the first subset provides the first service, wherein the second subset provides the second service, and wherein the first subset and the second subset are non-overlapping.

Figure 4A:
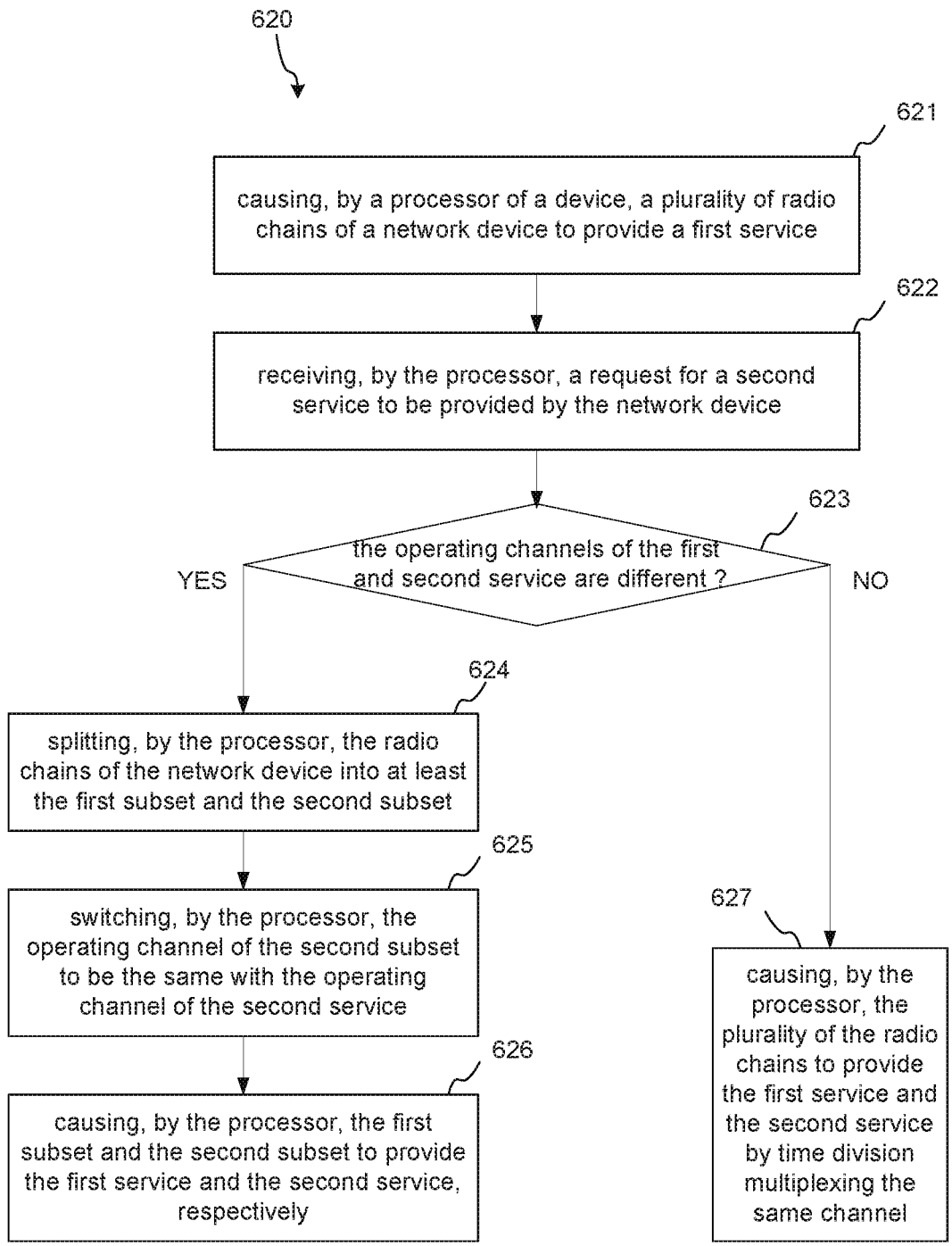
FIG. 4A and FIG. 4B are flow charts illustrating another example method of splitting the radio chains into subsets according to present disclosure.
Figure 4B:
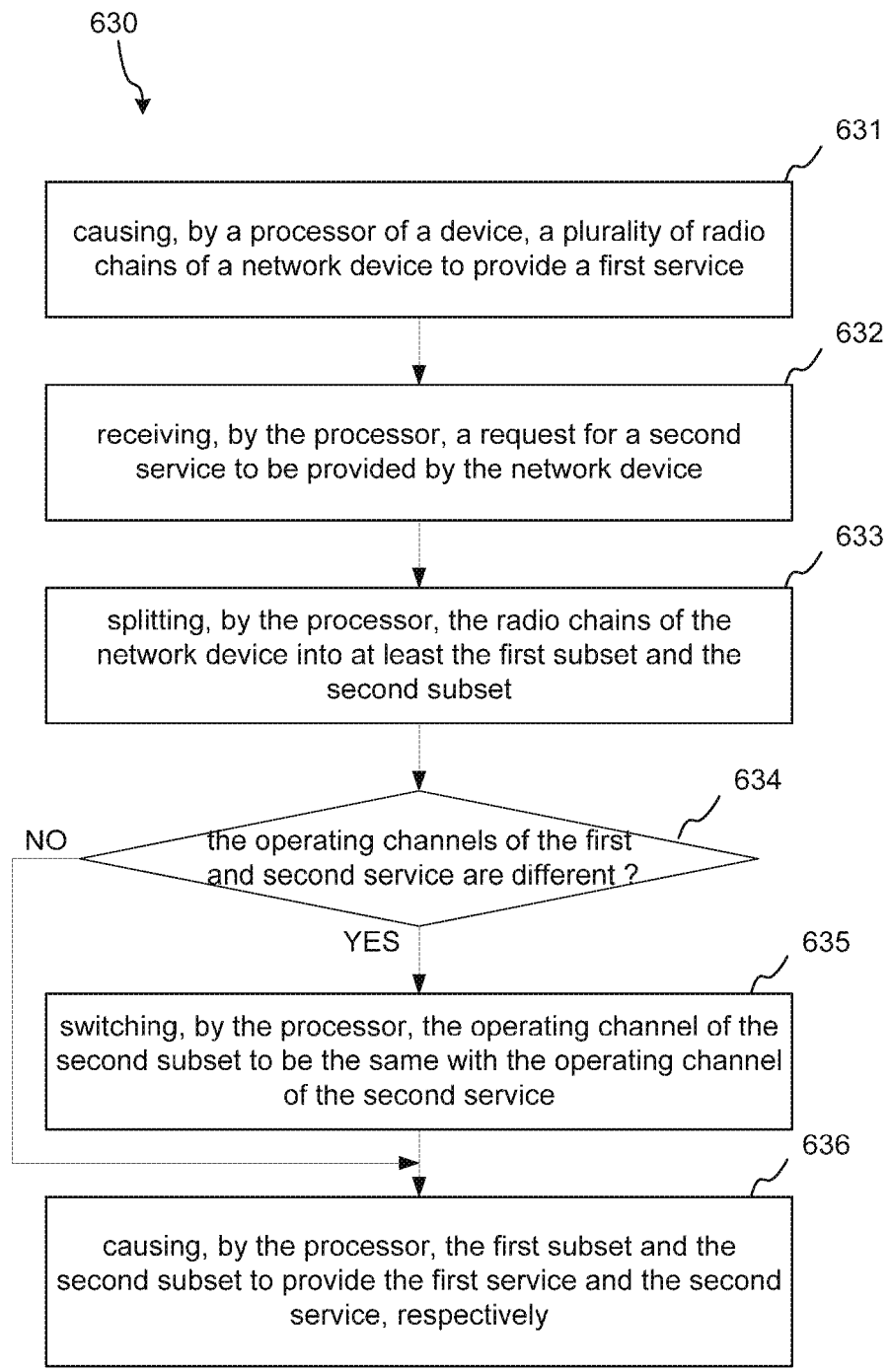

FIG. 4A and FIG. 4B are flow charts illustrating another example method of splitting the radio chains into subsets according to present disclosure. Referring to FIG. 4A:

The method 620 may comprise: causing, by a processor of a device, a plurality of radio chains of a network device to provide a first service, at block 621.

The method 620 may comprise: receiving, by the processor, a request for a second service to be provided by the network device, at block 622.

The method 620 may comprise: checking, by the processor, the operating channel associated with the second service, at block 623, so as to determine whether the operating channels of the first service and the second service are different. If yes, then the processor proceeds to blocks 624 to 626. If not, then the processor proceeds directly to block 627.

The method 620 may comprise: splitting, by the processor, the radio chains of the network device into at least the first subset and the second subset, in response to determining that the operating channel of the second service is different from that of the first service, at block 624.

The method 620 may comprise: switching, by the processor, the operating channel of the second subset to be the same as the operating channel of the second service, in response to determining that the operating channel of the second service is different from that of the first service, at block 625.

The method 620 may comprise: causing, by the processor, the first subset and the second subset to provide the first service and the second service, respectively, at block 626.

If the operating channels of the first service and the second service are same, the method 620 may comprise: causing, by the processor, the plurality of the radio chains to provide the first service and the second service by time division multiplexing the same channel at block 627.

According to the method 630 shown in FIG. 5B, the radio chains of the network device may be split in response to the request. Referring to FIG. 5B:

The method 630 may comprise: causing, by a processor of a device, a plurality of radio chains of a network device to provide a first service, at block 631.

The method 630 may comprise: receiving, by the processor, a request for a second service to be provided by the network device, at block 632.

The method 630 may comprise: splitting, by the processor, the radio chains of the network device into at least the first subset and the second subset, in response to the request, at block 633.

The method 630 may comprise: checking, by the processor, the operating channel associated with the second service, at block 634, so as to determine whether the operating channels of the first service and the second service are different. If yes, then the processor proceeds to blocks 635 to 636. If not, then the processor proceeds directly to block 636.

The method 630 may also comprise: switching, by the processor, the operating channel of the second subset to be the same as the operating channel of the second service, in response to determining that the operating channel of the second service is different from that of the first service, at block 635.

The method 630 may comprise: causing, by the processor, the first subset and the second subset to provide the first service and the second service, respectively, at block 636.

If the operating channels of the first service and the second service are same, the first service and the second service may be provided based on the first subset and the second subset operating on the same channel at block 636, without time division multiplexing the same channel, respectively. If the operating channels of the first service and the second service are different, after switching at 635, the second service may be provided on the second channel based on the second subset, while the first service may be provided on the first channel based on the first subset at block 636.

Figure 5:
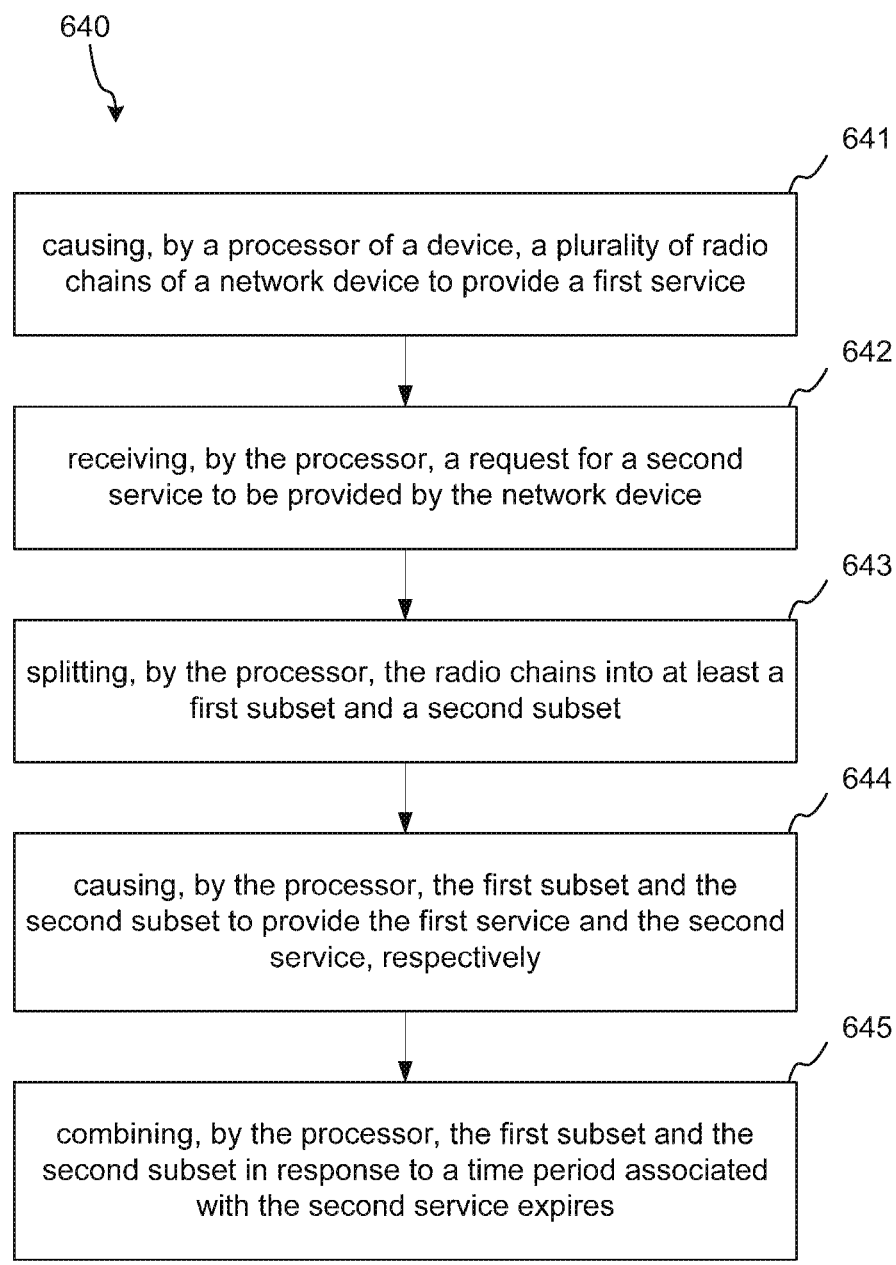
FIG. 5 is a flow chart illustrating another example method of splitting the radio chains into subsets according to present disclosure.

FIG. 5 is a flow chart illustrating another example method of splitting the radio chains into subsets according to present disclosure. Referring to FIG. 5:

The method 640 may comprise: causing, by a processor of a device, a plurality of radio chains of a network device to provide a first service, at block 641.

The method 640 may comprise: receiving, by the processor, a request for a second service to be provided by the network device, at block 642.

The method 640 may comprise: splitting, by the processor, the radio chains of the network device into at least the first subset and the second subset, at block 643.

The method 640 may comprise: causing, by the processor, the first subset and the second subset to provide the first service and the second service, respectively, at block 644.

The method 640 may also comprise: combining, by the processor, the first subset and the second subset in response to a time period associated with the second service expires, at block 645.

Figure 6A:
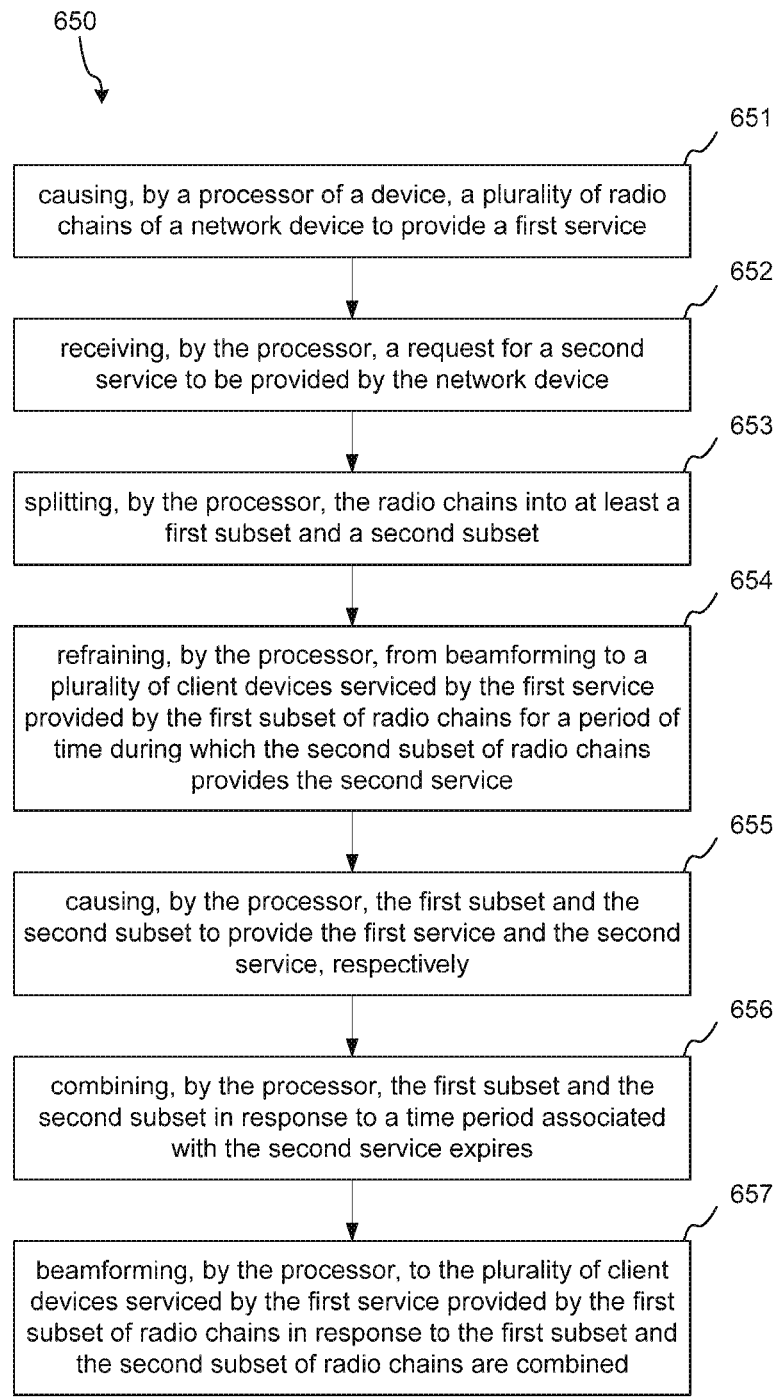
FIG. 6A to FIG. 6C are flow charts illustrating another example method of splitting the radio chains into subsets according to present disclosure.
Figure 6B:
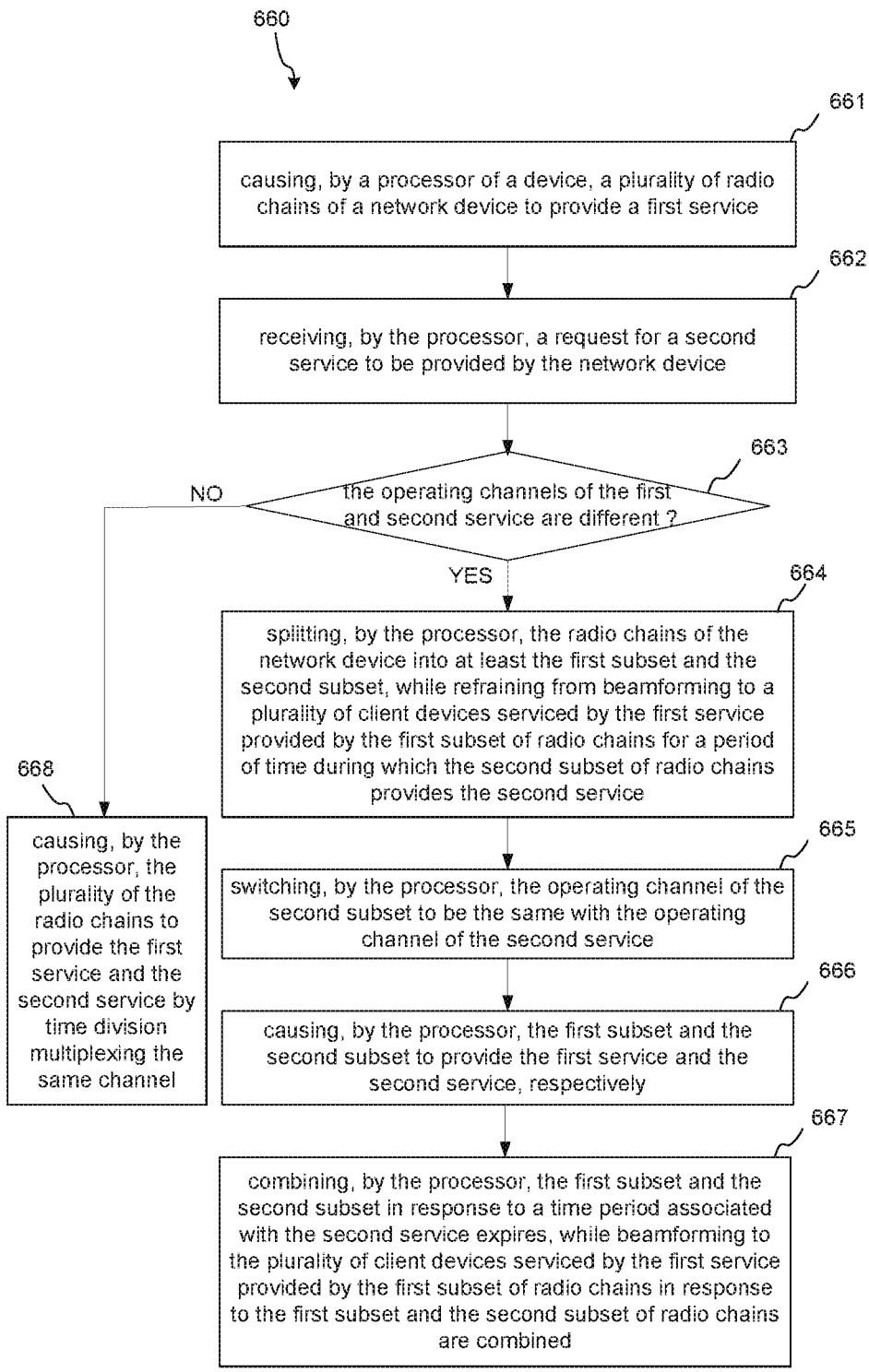
Figure 6C:
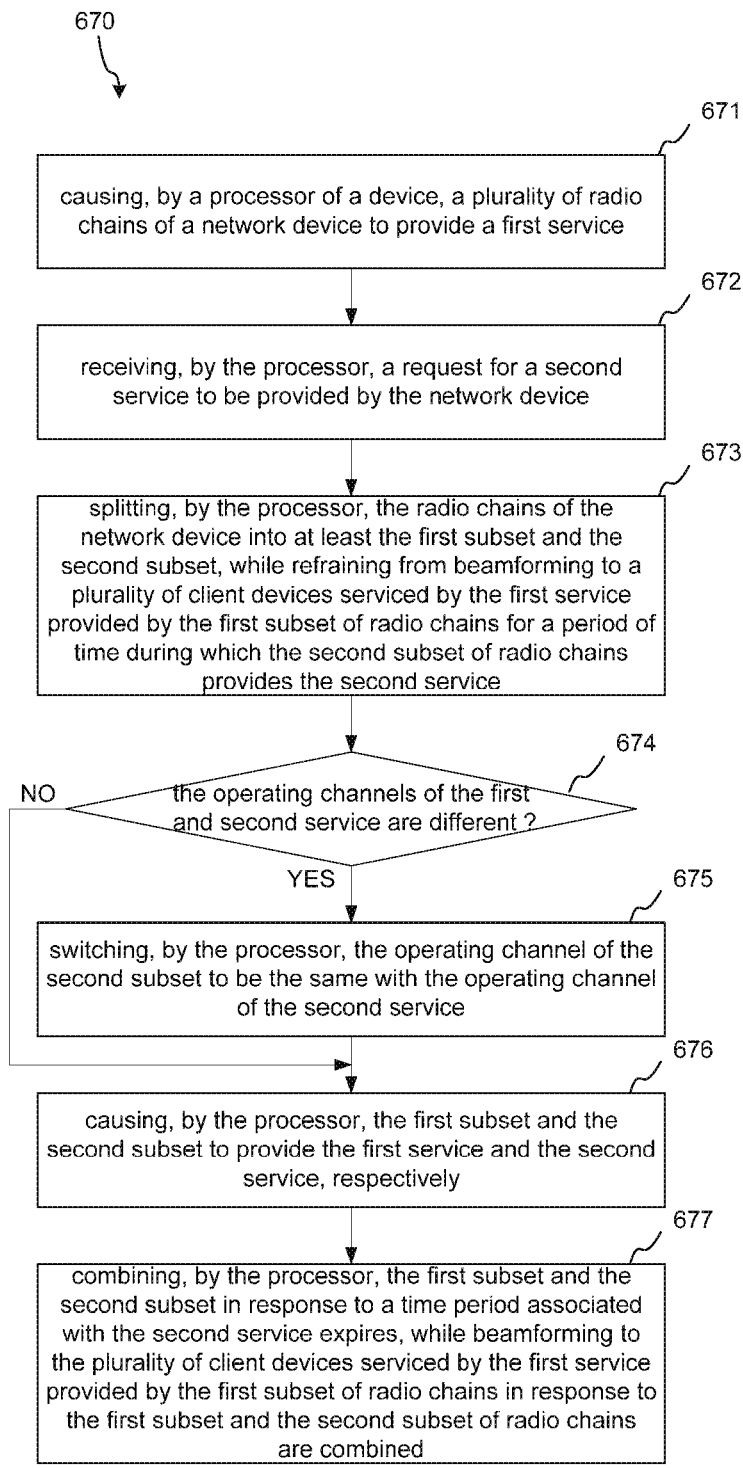

FIG. 6A to FIG. 6C are flow charts illustrating another example method of splitting the radio chains into subsets according to present disclosure.

Referring to FIG. 6A:

The method 650 may comprise: causing, by a processor of a device, a plurality of radio chains of a network device to provide a first service, at block 651.

The method 650 may comprise: receiving, by the processor, a request for a second service to be provided by the network device, at block 652.

The method 650 may comprise: splitting, by the processor, the radio chains of the network device into at least the first subset and the second subset, at block 653.

The method 650 may comprise: refraining, by the processor, from beamforming to a plurality of client devices serviced by the first service provided by the first subset of radio chains for a period of time during which the second subset of radio chains provides the second service, at block 654.

The method 650 may comprise: causing, by the processor, the first subset and the second subset to provide the first service and the second service, respectively, at block 655.

The method 650 may also comprise: combining, by the processor, the first subset and the second subset in response to a time period associated with the second service expires, at block 656.

The method 650 may also comprise: beamforming, by the processor, to the plurality of client devices serviced by the first service provided by the first subset of radio chains in response to the first subset and the second subset of radio chains are combined, at block 657.

After 657, the processor may proceed back to the block 651

Referring to FIG. 6B:

The method 660 may comprise: causing, by a processor of a device, a plurality of radio chains of a network device to provide a first service, at block 661.

The method 660 may comprise: receiving, by the processor, a request for a second service to be provided by the network device, at block 662.

The method 660 may comprise: checking, by the processor, the operating channel associated with the second service, at block 663, so as to determine whether the operating channels of the first service and the second service are different. If yes, then the processor proceeds to blocks 664 to 667. If not, then the processor proceeds directly to block 668.

The method 660 may comprise: splitting, by the processor, the radio chains of the network device into at least the first subset and the second subset, in response to determining that the operating channel of the second service is different from that of the first service, at block 664, while refraining from beamforming to a plurality of client devices serviced by the first service provided by the first subset of radio chains for a period of time during which the second subset of radio chains provides the second service.

The method 660 may comprise: switching, by the processor, the operating channel of the second subset to be the same as the operating channel of the second service, in response to determining that the operating channel of the second service is different from that of the first service, at block 665.

The method 660 may comprise: causing, by the processor, the first subset and the second subset to provide the first service and the second service, respectively, at 666.

The method 660 may also comprise: combining, by the processor, the first subset and the second subset in response to a time period associated with the second service expires, at block 667, while beamforming to the plurality of client devices serviced by the first service provided by the first subset of radio chains in response to the first subset and the second subset of radio chains are combined.

If the operating channels of the first service and the second service are same, the method 660 may comprise: causing, by the processor, the plurality of the radio chains to provide the first service and the second service by time division multiplexing the same channel at block 668.

Referring to FIG. 6C:

The method 670 may comprise: causing, by a processor of a device, a plurality of radio chains of a network device to provide a first service, at block 671.

The method 670 may comprise: receiving, by the processor, a request for a second service to be provided by the network device, at block 672.

The method 670 may comprise: splitting, by the processor, the radio chains of the network device into at least the first subset and the second subset, in response to the request, at block 673, while refraining from beamforming to a plurality of client devices serviced by the first service provided by the first subset of radio chains for a period of time during which the second subset of radio chains provides the second service.

The method 670 may comprise: checking, by the processor, the operating channel associated with the second service, at block 674, so as to determine whether the operating channels of the first service and the second service are different. If yes, then the processor proceeds to blocks 675 to 676. If not, then the processor proceeds directly to block 676.

The method 670 may also comprise: switching, by the processor, the operating channel of the second subset to be the same as the operating channel of the second service, in response to determining that the operating channel of the second service is different from that of the first service, at block 675.

The method 670 may comprise: causing, by the processor, the first subset and the second subset to provide the first service and the second service, respectively, at block 676.

If the operating channels of the first service and the second service are same, the first service and the second service may be provided based on the first subset and the second subset operating on the same channel at block 676, without time division multiplexing the same channel, respectively. If the operating channels of the first service and the second service are different, after switching at 675, the second service may be provided on the second channel based on the second subset, while the first service may be provided on the first channel based on the first subset at block 676.

The method 670 may also comprise: combining, by the processor, the first subset and the second subset in response to a time period associated with the second service expires, at block 677, while beamforming to the plurality of client devices serviced by the first service provided by the first subset of radio chains in response to the first subset and the second subset of radio chains are combined.

Figure 7:
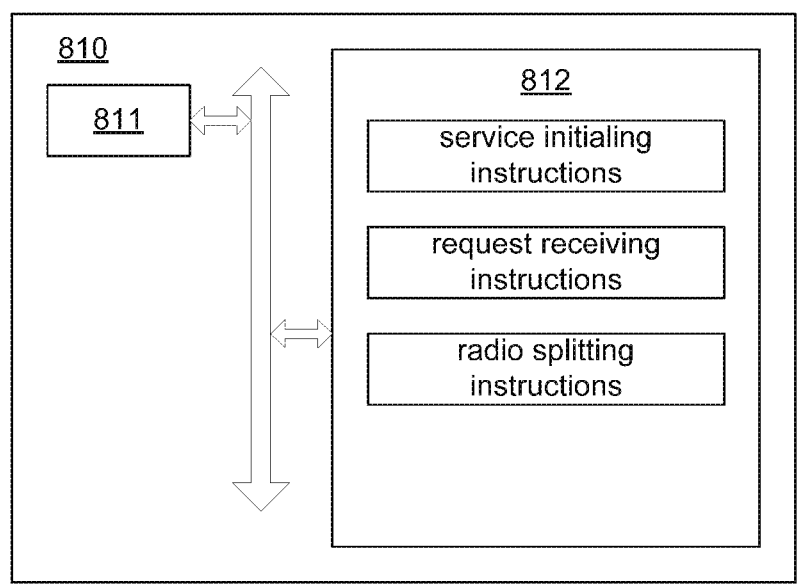
FIG. 7 is a block diagram illustrating an example device according to present disclosure.

FIG. 7 is a block diagram illustrating an example device according to present disclosure. Referring to FIG. 7, the device 810 includes a processor 811 and a non-transitory computer readable storage medium 812.

The non-transitory computer readable storage medium 812 may store instructions executable for the possessor 811.

The instructions may include service initialing instructions that, when executed by the processor 811, may cause the processor 811 to cause a plurality of radio chains of a network device to provide a first service.

The instructions may include request receiving instructions that, when executed by the processor 811, may cause the processor 811 to receive a request for a second service to be provided by the network device.

The instructions may also include radio splitting instructions that, when executed by the processor 811, may cause the processor 811 to splitting, by the processor, the radio chains into at least a first subset and a second subset, wherein the first subset provides the first service, wherein the second subset provides the second service, and wherein the first subset and the second subset are non-overlapping.

Figure 8:
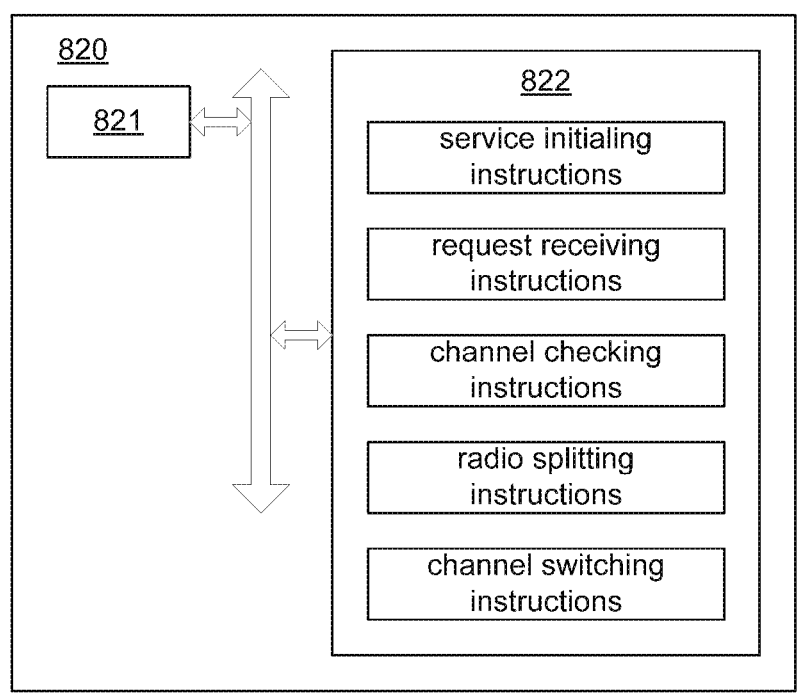
FIG. 8 is a block diagram illustrating another example device according to present disclosure.

FIG. 8 is a block diagram illustrating another example device according to present disclosure. Referring to FIG. 8, the device 820 includes a processor 821 and a non-transitory computer readable storage medium 822.

The instructions may include service initialing instructions that, when executed by the processor 821, may cause the processor 821 to cause a plurality of radio chains of a network device to provide a first service.

The instructions may include request receiving instructions that, when executed by the processor 821, may cause the processor 821 to receive a request for a second service to be provided by the network device.

The instructions may also include channel checking instructions that, when executed by the processor 821, may cause the processor 821 to check the operating channel associated with the second service.

The instructions may also include radio splitting instructions that, when executed by the processor 821, may cause the processor 821 to split the radio chains into at least the first subset and the second subset.

In some cases, the radio chains of the network device may be split by the processor executing the radio splitting instructions, in response to determining that the operating channel of the second service is different from that of the first service. In other examples, the radio chains of the network device may be split by the processor executing the radio splitting instructions, in response to the received request.

The instructions may also include channel switching instructions that, when executed by the processor 821, may cause the processor 821 to switch the operating channel of the second subset to be the same as the operating channel of the second service, in response to determining that the operating channel of the second service is different from that of the first service.

Figure 9:
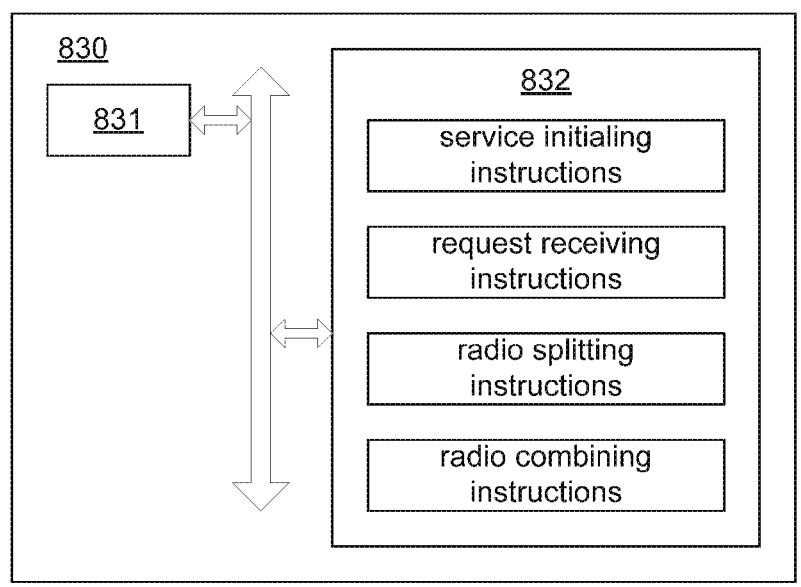
FIG. 9 is a block diagram illustrating another example device according to present disclosure.

FIG. 9 is a block diagram illustrating another example device according to present disclosure. Referring to FIG. 9, the device 830 includes a processor 831 and a non-transitory computer readable storage medium 832.

The non-transitory computer readable storage medium 832 may store instructions executable for the possessor 831.

The instructions may include service initialing instructions that, when executed by the processor 831, may cause the processor 831 to cause a plurality of radio chains of a network device to provide a first service.

The instructions may include request receiving instructions that, when executed by the processor 831, may cause the processor 831 to receive a request for a second service to be provided by the network device.

The instructions may also include radio splitting instructions that, when executed by the processor 831, may cause the processor 831 to split the radio chains into at least the first subset and the second subset.

The instructions may also include radio combining instructions that, when executed by the processor 831, may cause the processor 831 to combine the first subset and the second subset in response to a time period associated with the second service expires.

Additionally, the instructions may further include the channel checking instructions and the channel switching instruction stored in the non-transitory computer readable storage medium 822 shown in FIG. 8. And, the channel switching instruction, when executed by the processor 831, may further cause the processor 831 to switch the operating channels of the first and second subsets to the same channel, when the subsets are combined.

Figure 10:
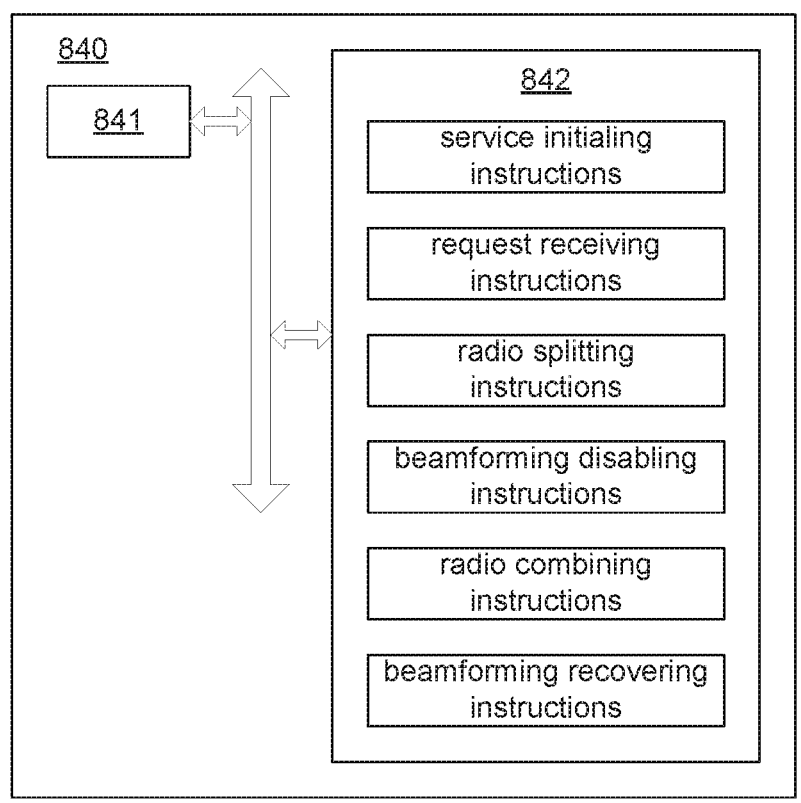
FIG. 10 is a block diagram illustrating another example device according to present disclosure.

FIG. 10 is a block diagram illustrating another example device according to present disclosure. Referring to FIG. 10, the device 840 includes a processor 841 and a non-transitory computer readable storage medium 842.

The non-transitory computer readable storage medium 842 may store instructions executable for the possessor 841.

The instructions may include service initialing instructions that, when executed by the processor 841, may cause the processor 841 to cause a plurality of radio chains of a network device to provide a first service.

The instructions may include request receiving instructions that, when executed by the processor 841, may cause the processor 841 to receive a request for a second service to be provided by the network device.

The instructions may also include radio splitting instructions that, when executed by the processor 841, may cause the processor 841 to split the radio chains into at least the first subset and the second subset.

The instructions may include beamforming disabling instructions that, when executed by the processor 841, may cause the processor 841 to refrain from beamforming to a plurality of client devices serviced by the first service provided by the first subset of radio chains for a period of time during which the second subset of radio chains provides the second service.

The instructions may also include radio combining instructions that, when executed by the processor 841, may cause the processor 841 to combine the first subset and the second subset in response to a time period associated with the second service expires.

The instructions may also include beamforming recovering instructions that, when executed by the processor 841, may cause the processor 841 to beamform to the plurality of client devices serviced by the first service provided by the first subset of radio chains in response to the first subset and the second subset of radio chains are combined.

Additionally, the instructions may further include the channel checking instructions and the channel switching instruction stored in the non-transitory computer readable storage medium 822 shown in FIG. 8. And, the channel switching instruction, when executed by the processor 841, may further cause the processor 841 to switch the operating channels of the first and second subsets to the same channel, when the subsets are combined.

Figure 11:
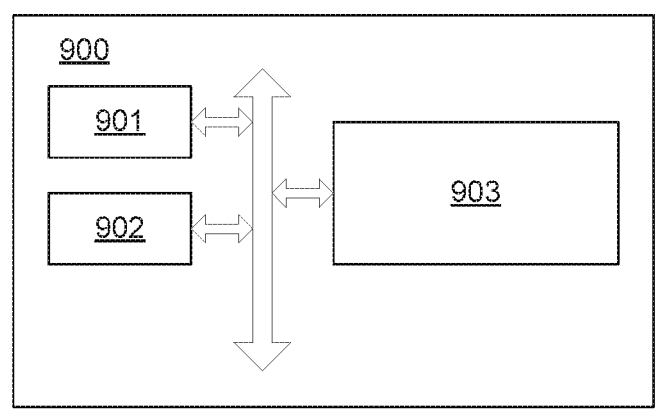
FIG. 11 is a block diagram illustrating an example network device according to present disclosure.

FIG. 11 is a block diagram illustrating an example network device according to present disclosure. Referring to FIG. 11, the network device 900 includes a radio 901, a processor 902 and a non-transitory computer readable storage medium 903.

The radio 921 may provide radio chains for the network device 900. The non-transitory computer readable storage medium 903 may store instructions executable for the possessor 902, the instructions may include the instructions stored in the non-transitory computer readable storage medium 812, 822, 832 or 842.

While the present disclosure has been described in connection with certain example embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A device comprising a processor to:
   cause a plurality of radio chains of a network device to provide a first service;
   receive a request for a second service to be provided by the network device;
   split the plurality of radio chains into at least a first subset and a second subset, wherein the first subset provides the first service, wherein the second subset provides the second service, and wherein the first subset and the second subset are non-overlapping.

2. The device of claim 1, wherein the processor is further to:
   check the operating channel associated with the second service.

3. The device of claim 2, wherein the processor is further to:
   switch the operating channel of the second subset to be the same as the operating channel of the second service, in response to determining that the operating channel of the second service is different from that of the first service.

4. The device of claim 1, wherein the processor is further to:
   combine the first subset and the second subset in response to a time period associated with the second service expires.

5. The device of claim 1, wherein the processor is further to:
   refrain from beamforming to a plurality of client devices serviced by the first service provided by the first subset of radio chains for a period of time during which the second subset of radio chains provides the second service.

6. The device of claim 5, wherein the processor is further to:
   beamform to the plurality of client devices serviced by the first service provided by the first subset of radio chains in response to the first subset and the second subset of radio chains are combined.

7. The device of claim 1, wherein the first service comprises an wireless network access service, and the second service comprises a testing service.

8. A method comprising:
   causing, by a processor of a device, a plurality of radio chains of a network device to provide a first service;
   receiving, by the processor, a request for a second service to be provided by the network device;
   splitting, by the processor, the radio chains into at least a first subset and a second subset, wherein the first subset provides the first service, wherein the second subset provides the second service, and wherein the first subset and the second subset are non-overlapping.

9. The method of claim 8, further comprising:
   checking, by the processor, the operating channel associated with the second service.

10. The method of claim 9, further comprising:
    switching, by the processor, the operating channel of the second subset to be the same as the operating channel of the second service, in response to determining that the operating channel of the second service is different from that of the first service.

11. The method of claim 8, further comprising:
    combining, by the processor, the first subset and the second subset in response to a time period associated with the second service expires.

12. The method of claim 8, further comprising:
    refraining, by the processor, from beamforming to a plurality of client devices serviced by the first service provided by the first subset of radio chains for a period of time during which the second subset of radio chains provides the second service.

13. The method of claim 11, further comprising:
    beamforming, by the processor, to the plurality of client devices serviced by the first service provided by the first subset of radio chains in response to the first subset and the second subset of radio chains are combined.

14. A non-transitory computer readable storage medium storing instructions that, when executed by a processor of a device, causes the processor to:
    cause a plurality of radio chains of a network device to provide a first service;
    receive a request for a second service to be provided by the network device;
    split the plurality of radio chains into at least a first subset and a second subset, wherein the first subset provides the first service, wherein the second subset provides the second service, and wherein the first subset and the second subset are non-overlapping.

15. The non-transitory computer readable storage medium of claim 14, wherein the instructions further cause the processor to:
    refrain from beamforming to a plurality of client devices serviced by the first service provided by the first subset of radio chains for a period of time during which the second subset of radio chains provides the second service;

beamform to the plurality of client devices serviced by the first subset of radio chains in response to the first subset and the second subset of radio chains are combined.

\* \* \* \* \*